US005700954A

United States Patent [19]

Sinha et al.

[11] Patent Number: 5,700,954

[45] Date of Patent: Dec. 23, 1997

[54] METHOD OF CONTROLLING FUEL DURING ENGINE MISFIRE

[75] Inventors: Satyadeo Narain Sinha, Canton; Arthur Joseph Varady, Chelsea, both of Mich.; Richard John Gilbert, Braintree, England

[73] Assignee: Ford Global Technologies, Inc., Dearborn, Mich.

[21] Appl. No.: 740,577

[22] Filed: Oct. 31, 1996

[51] Int. Cl.[6] .................................................. G01M 15/00

[52] U.S. Cl. ......................... 73/116; 73/117.3; 73/119 A

[58] Field of Search .................................. 73/116, 117.2, 73/117.3, 119 A; 123/419, 425, 436; 364/431.07, 431.08

[56] References Cited

U.S. PATENT DOCUMENTS

| | | | |
|---|---|---|---|
| Re. 34,234 | 4/1993 | Kuroiwa et al. | 123/425 |
| 4,445,326 | 5/1984 | Lyon | 73/117.3 |
| 4,903,669 | 2/1990 | Groff et al. | 73/119 A |
| 4,979,481 | 12/1990 | Shimomura et al. | 123/481 |
| 5,044,195 | 9/1991 | James et al. | 73/117.3 |
| 5,056,026 | 10/1991 | Mitchell et al. | 73/119 A |
| 5,168,859 | 12/1992 | Ohsaki | 73/116 |
| 5,452,699 | 9/1995 | Rossignol | 123/481 |

*Primary Examiner*—George M. Dombroske
*Attorney, Agent, or Firm*—Allan J. Lippa; Roger L. May

[57] ABSTRACT

A misfire correction factor is included in the calculation of the fuel pulse width so that upon detection of a misfire, the excess fuel that would normally have entered the engine is offset or canceled, thus reducing or desensitizing the effects of the reaction of the lean biased exhaust gas oxygen sensor signal. This compensation allows for normally firing cylinders to operate closer to stoichiometric air/fuel ratio when other cylinders are operating in a misfire condition. The fuel adjustment due to engine misfire not only protects against catalyst degradation, but also decreases unwanted emissions.

3 Claims, 6 Drawing Sheets

METHOD OF CONTROLLING FUEL DURING ENGINE MISFIRE

TECHNICAL FIELD

This invention relates to fuel control systems and, more particularly, to a method of protecting a catalytic converter from the effects of engine misfire or fuel injector failure.

BACKGROUND OF THE INVENTION

In the event of engine misfire or fuel injector failure, the catalytic converter may overheat rapidly to a critical temperature where degradation to the catalyst will occur. During misfire, the oxygen sensor detects the presence of excess oxygen in the vehicle's exhaust stream; and in closed loop operations, this results in excessively rich fuel control which has the effect of raising the catalyst temperature. It is desirable, therefore, to take some action that will alleviate this condition, thereby avoiding catalyst degradation and in the process be capable of withstanding higher misfire thresholds while still meeting vehicle tailpipe emissions standard.

During misfire, the exhaust gases contain large amounts of unburned fuel and excess oxygen (air). When this oxygen-rich gas mixture passes through the front exhaust gas oxygen sensor, the sensor outputs a low voltage signal (due to the presence of excess oxygen in the exhaust). In response, the fuel controller provides more fuel to the engine, making the misfire situation worse. It has been observed that the fuel control stays closed loop throughout this process except at wide open throttle condition. As a result, during misfire, the exhaust gas oxygen sensor signal experiences a strong lean bias triggering a rich fuel shift in the fuel control system for the entire duration of misfire. During this time, the unburnt fuel and the excess oxygen in the exhaust combine and the exothermic chemical reaction (burning) produces excess heat inside the catalytic converter, driving its temperature high very rapidly to a level where degradation of the catalytic converter can occur. The vehicle tailpipe emission levels also are affected.

SUMMARY OF THE INVENTION

In view of the above, the present invention provides a system and method of compensating for the fuel control bias, resulting from a misfire, by reducing the excess fuel supplied to the engine in an attempt to bring the air/fuel ratio inside all non-misfiring cylinders close to stoichiometric to minimize any excess fuel (unburned) available to combine with the excess air in the exhaust stream when the exhaust gases pass through the catalytic converter. This is even more important if and when fuel is cut off to the misfiring cylinder as a result of any triggered failure mode action, which will provide excess air into the exhaust stream through the misfiring cylinder which will cause the oxygen sensor to produce a lean signal triggering a rich bias in the fuel control system.

In accordance with the present invention, the rich fuel control bias can be compensated by one or more of the following methods. A misfire correction factor may be included in the calculation of the fuel control signal so that upon detection of a misfire, the excess fuel that would normally have entered the engine is offset or canceled, thus reducing or desensitizing the effects of the reaction of the lean biased exhaust gas oxygen sensor signal. This compensation allows for normally firing cylinders to operate closer to stoichiometric air/fuel ratio when other cylinders are operating in a misfire condition. The fuel adjustment due to engine misfire not only protects against catalyst damage, but also decreases unwanted emissions.

BRIEF DESCRIPTION OF THE DRAWINGS

A more complete understanding of the present invention may be had from the following detailed description which should be read in conjunction with the drawings in which.

DETAILED DESCRIPTION OF THE PREFERRED EMBODIMENT

Figure 1:
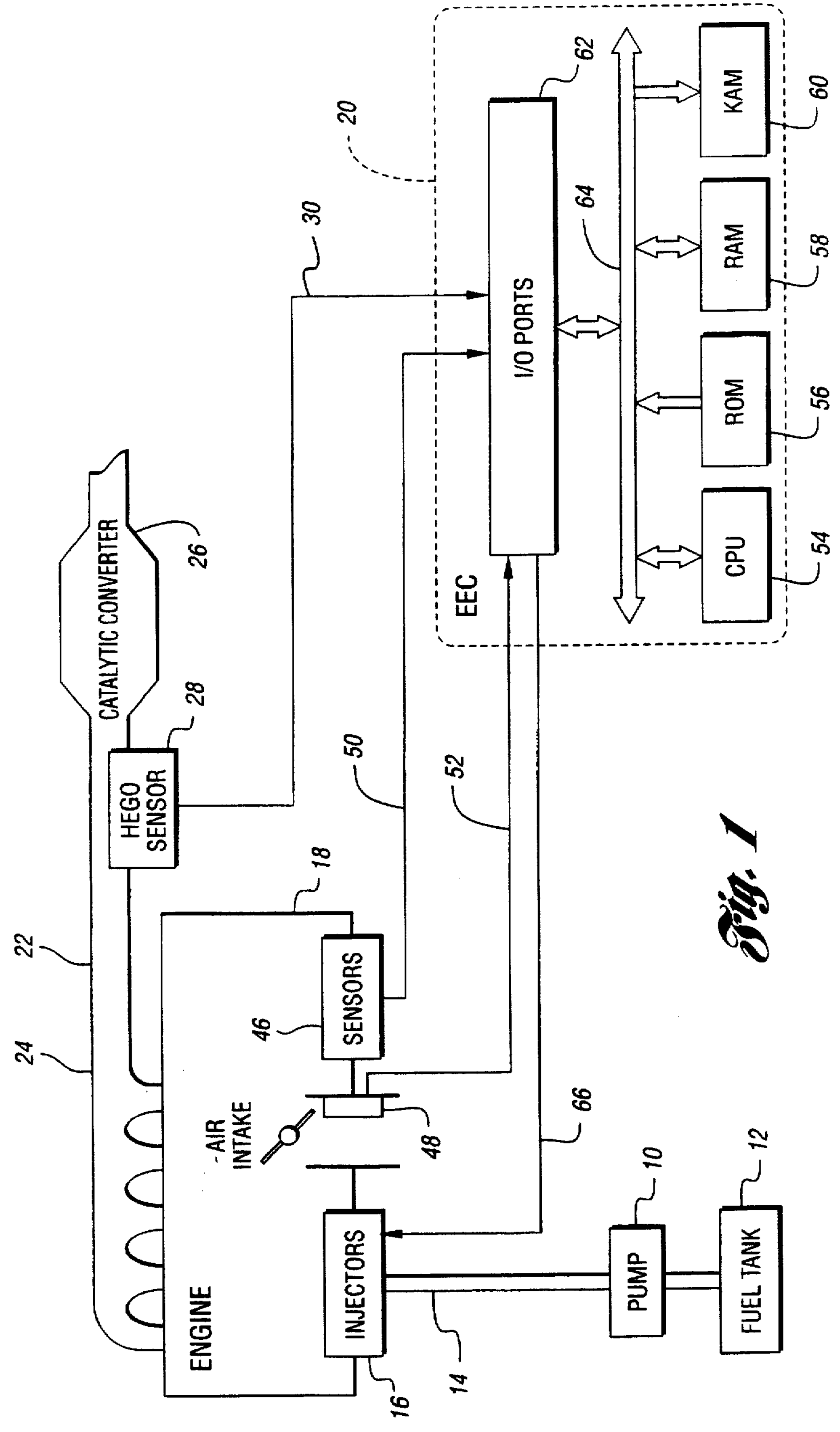
FIG. 1 is an overall block diagram of the control system of the present invention.
Figure 2A:
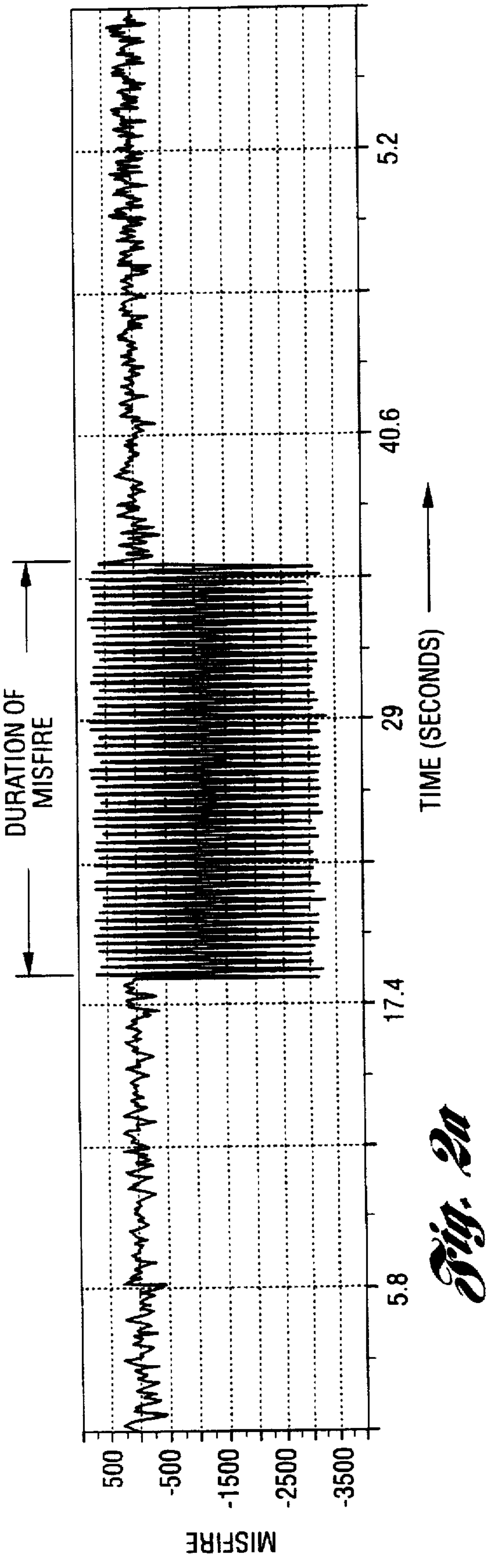
FIGS. 2*a*, 2*b*, and 2*c* are timing diagrams showing the effect of engine misfire on catalyst temperature.
Figure 2B:
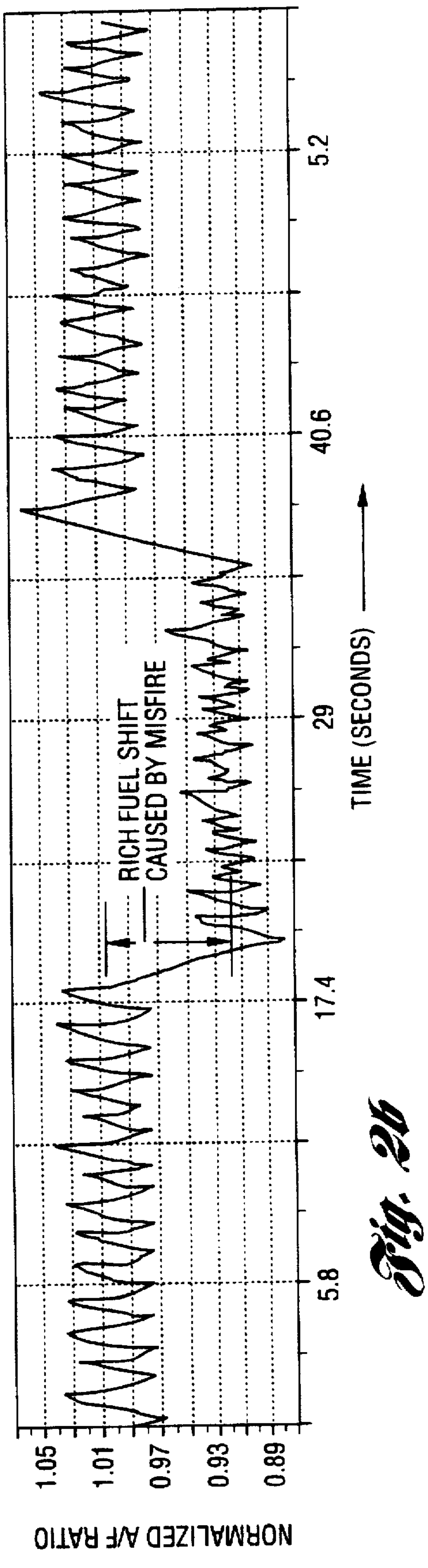
Figure 2C:
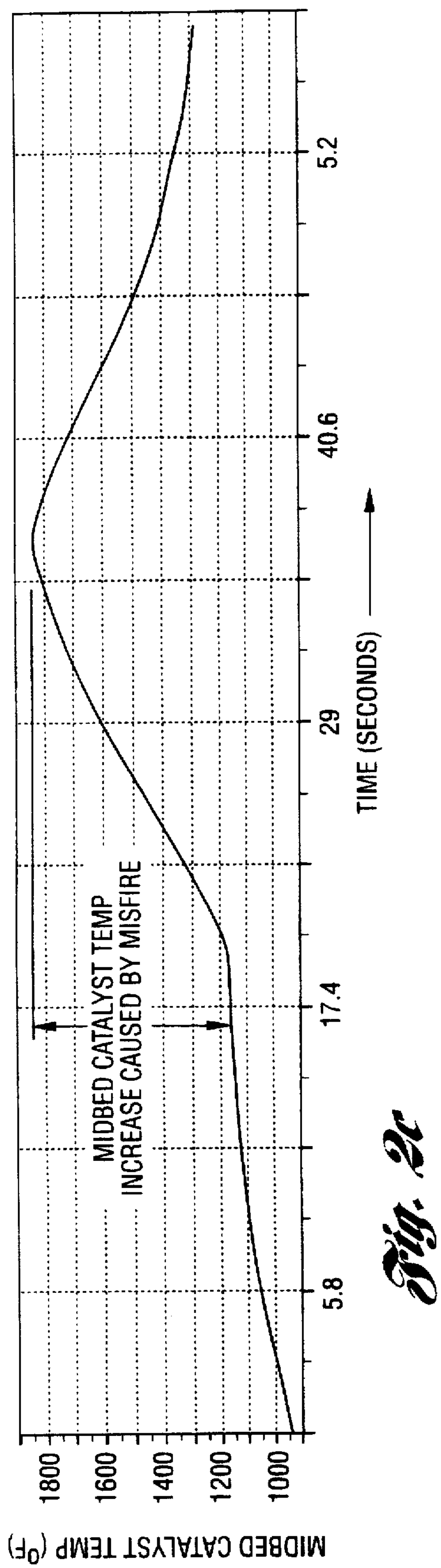
Figure 3A:
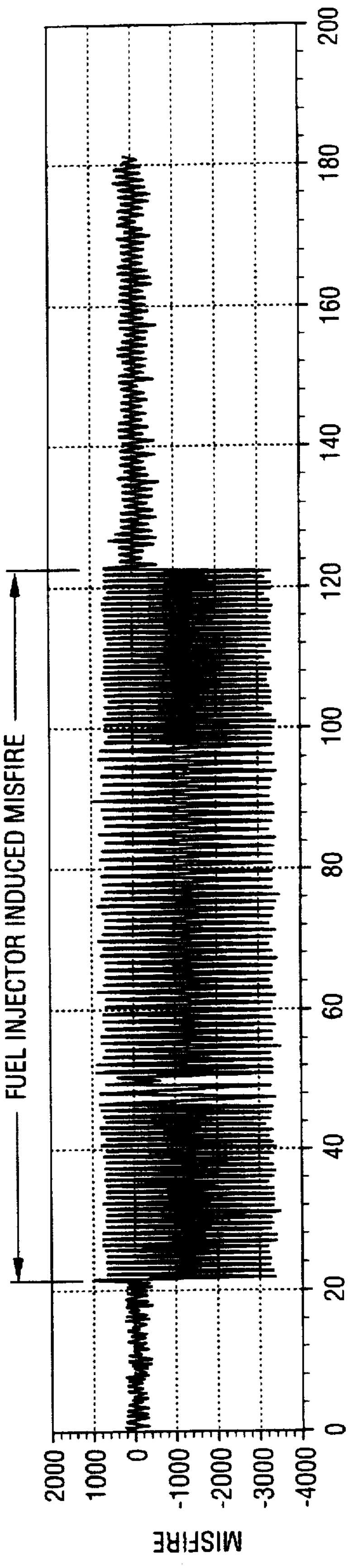
FIGS. 3*a*, 3*b*, and 3*c* are timing diagrams showing the effect of the compensation of the present invention on catalyst temperature.
Figure 3B:
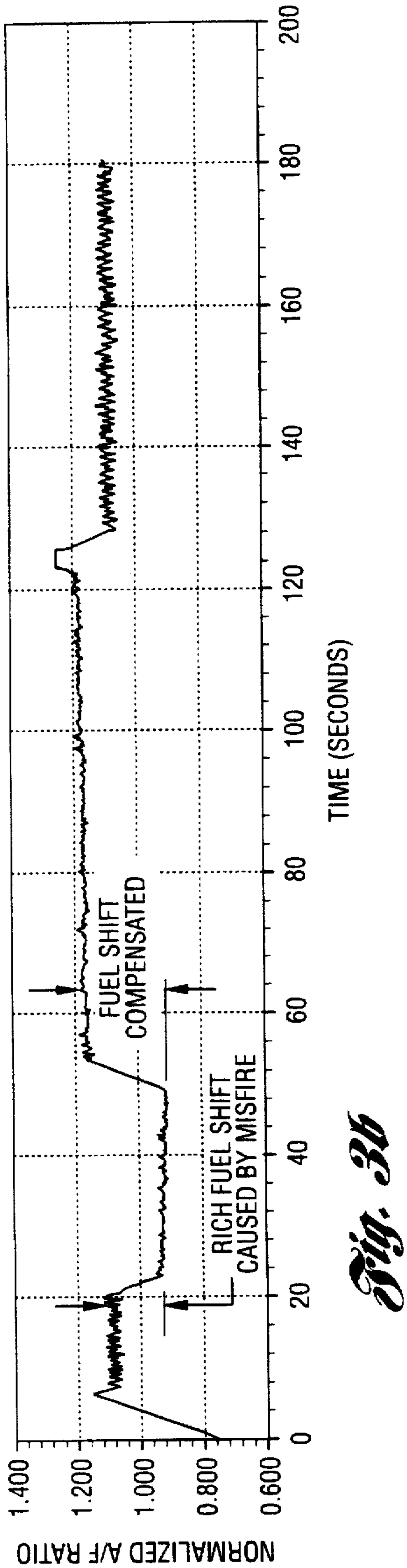
Figure 3C:
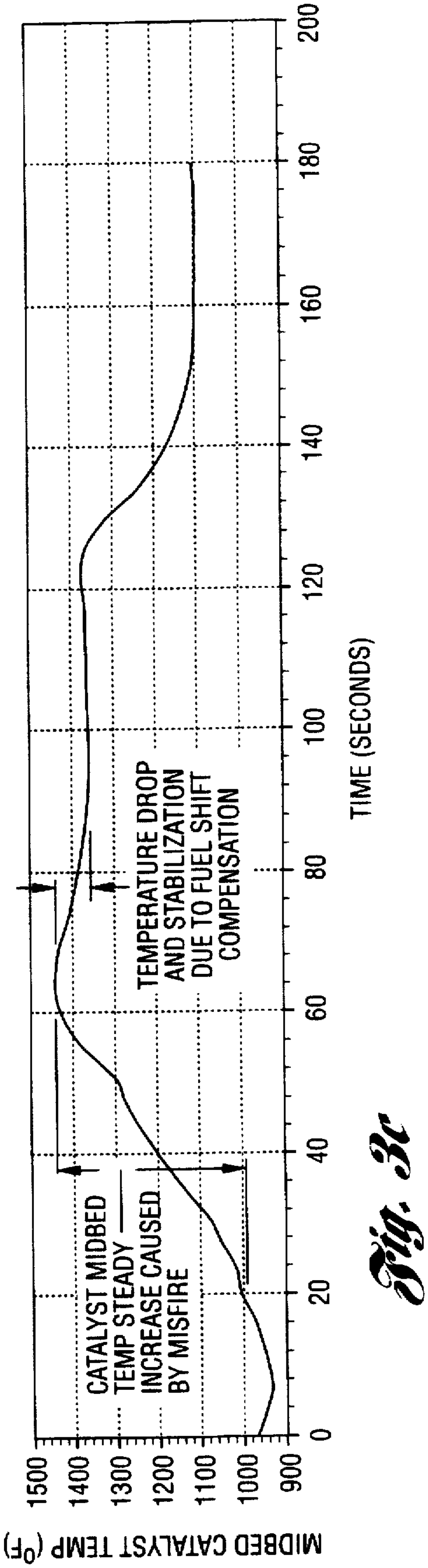

Referring now to the drawings and initially to FIG. 1, a block diagram of the present invention is shown. A fuel pump 10 pumps fuel from a tank 12 through a fuel line 14 to a set of injectors 16 which inject fuel into an internal combustion engine 18. The fuel injectors 16 are of conventional design and are positioned to inject fuel into their associated cylinder in precise quantities as determined by an electronic engine controller (EEC) 20. The fuel tank 12 contains fuels, such as gasoline, methanol or a combination of fuel types.

An exhaust system 22, comprising one or more exhaust pipes and an exhaust flange seen at 24, transports exhaust gas produced from combustion of an air/fuel mixture in the engine to a conventional three-way catalytic converter 26. The converter 26 contains catalyst material that chemically alters the exhaust gas to generate a catalyzed exhaust gas. A heated exhaust gas oxygen (MEGO) sensor 28, detects the oxygen content of the exhaust gas generated by the engine 18, and transmits a representative signal over conductor 30 to the EEC 20.

Still other sensors, indicated generally at 46, provide additional information about engine performance to the EEC 20, such as crankshaft position, angular velocity, throttle position, air temperature, etc., over conductor 50. The information from these sensors is used by the EEC 20 to control engine operation.

A mass air flow sensor 48 positioned at the air intake of engine 18 detects the amount of air inducted into an induction system of the engine and supplies an air flow signal over conductor 52 to the EEC 20. The air flow signal is utilized by EEC 20 to calculate a value that is indicative of the air mass flowing into the induction system in lbs./min.

The EEC 20 comprises a microcomputer including a central processor unit (CPU) 54, read only memory (ROM) 56 for storing control programs, random access memory (RAM) 58, for temporary data storage which may also be used for counters or timers, and keep-alive memory (KAM) 60 for storing learned values. Data is input and output over I/O ports generally indicated at 62, and communicated internally over a conventional data bus generally indicated at 64. The EEC 20 transmits a fuel injector signal to the injectors 16 via signal line 64. The fuel injector signal is varied over time by EEC 20 to maintain an air/fuel ratio determined by the EEC 20.

The fuel delivery routine executed by controller 20 for controlling engine 18 may include both an open loop and a closed loop calculation of desired fuel depending on engine operating condition. The controller 20 provides a pulse width signal for actuating fuel injector 16 thereby delivering fuel to engine 18 in relation to the magnitude of the desired fuel signal. Under open loop operation an open loop calculation of desired liquid fuel is calculated based on inducted mass air flow from sensor 48 divided by a desired air/fuel ratio which in this example, is correlated with stoichiometric combustion. Under closed loop control, a two-state signal is generated at from the signal provided by the sensor 48. A predetermined proportional term is subtracted from a feedback variable when the signal is low, but was high during the previous background loop of controller 20. When the signal is low and was also low during the previous background loop a predetermined integral term is subtracted from the feedback variable. On the other hand, when the signal is high and was also high during the previous background loop of controller 20, integral term is added to the feedback variable. When the signal is high but was low during the previous background loop the proportional term is added to the feedback variable.

Referring now to FIGS. *2a–2c*, timing diagrams show the effect of engine misfire on catalyst temperature. It can be seen that for the duration of the misfire in FIG. *2a*, a rich fuel shift occurs in the air/fuel ratio as shown in FIG. *2b*. As shown in FIG. *2c*, an uncompensated misfire causes a rise in the midbed catalyst temperature that may exceed a predetermined catalyst temperature threshold sufficient to cause degradation to the catalyst.

In FIGS. *3a–3c*, timing diagrams show the effect of the compensation of the present invention on catalyst temperature for a fuel injector induced misfire. As can be seen from the diagrams, a rise in catalyst temperature is caused by the misfire and resulting rich fuel shift. When the compensation proposed by the present invention was provided, the temperature of the catalyst was prevented from reaching the threshold level and eventually dropped and stabilized at a substantially lower temperature than that reached when the misfire initially occurred.

Figure 4:
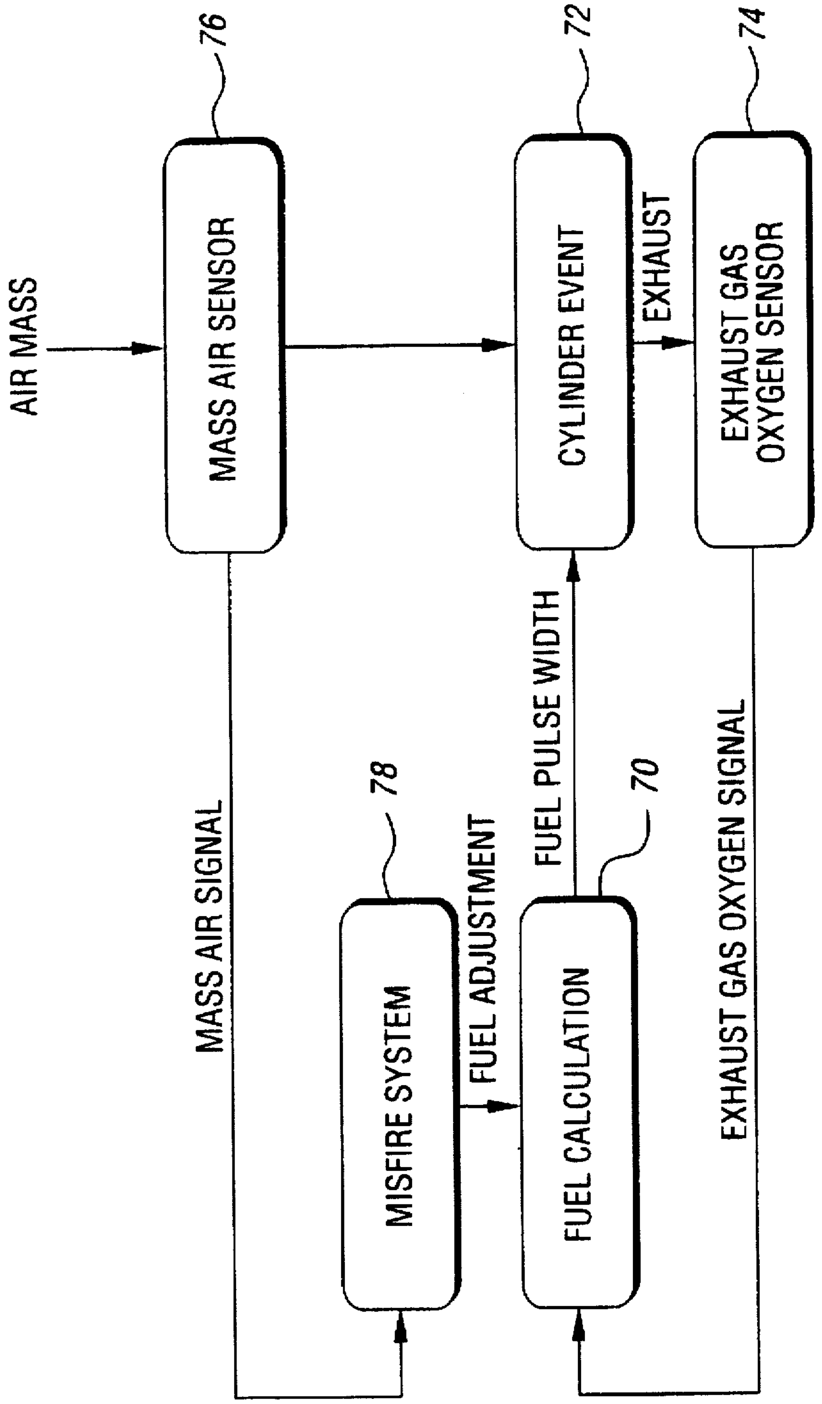
FIG. 4 is a generalized block diagram of one example of compensation involving fuel adjustment to offset the rich fuel shift in the event of misfire.

Referring now to FIG. 4, a generalized block diagram of one example of a compensation scheme for offsetting the rich fuel shift in the event of misfire is shown. In this example a fuel calculation block 70 produces a pulse width signal that is used to control the amount of fuel supplied to the fuel injectors. The fuel is mixed with air from an intake manifold to produce a cylinder event depicted at 72 which, in turn, produces exhaust gas that is detected by an exhaust gas oxygen sensor block indicated at 74. The sensor block 74 as well as a mass air sensor block 76 provide inputs to the fuel calculation in order to maintain a stoichiometric condition. A fuel adjustment to the pulse width is provided by the misfire system block generally indicated at 78. The amount of the adjustment to pulse width may be dependent on mass air flow and other engine operating conditions such as engine speed, load and misfire rates and/or types.

Figure 5:
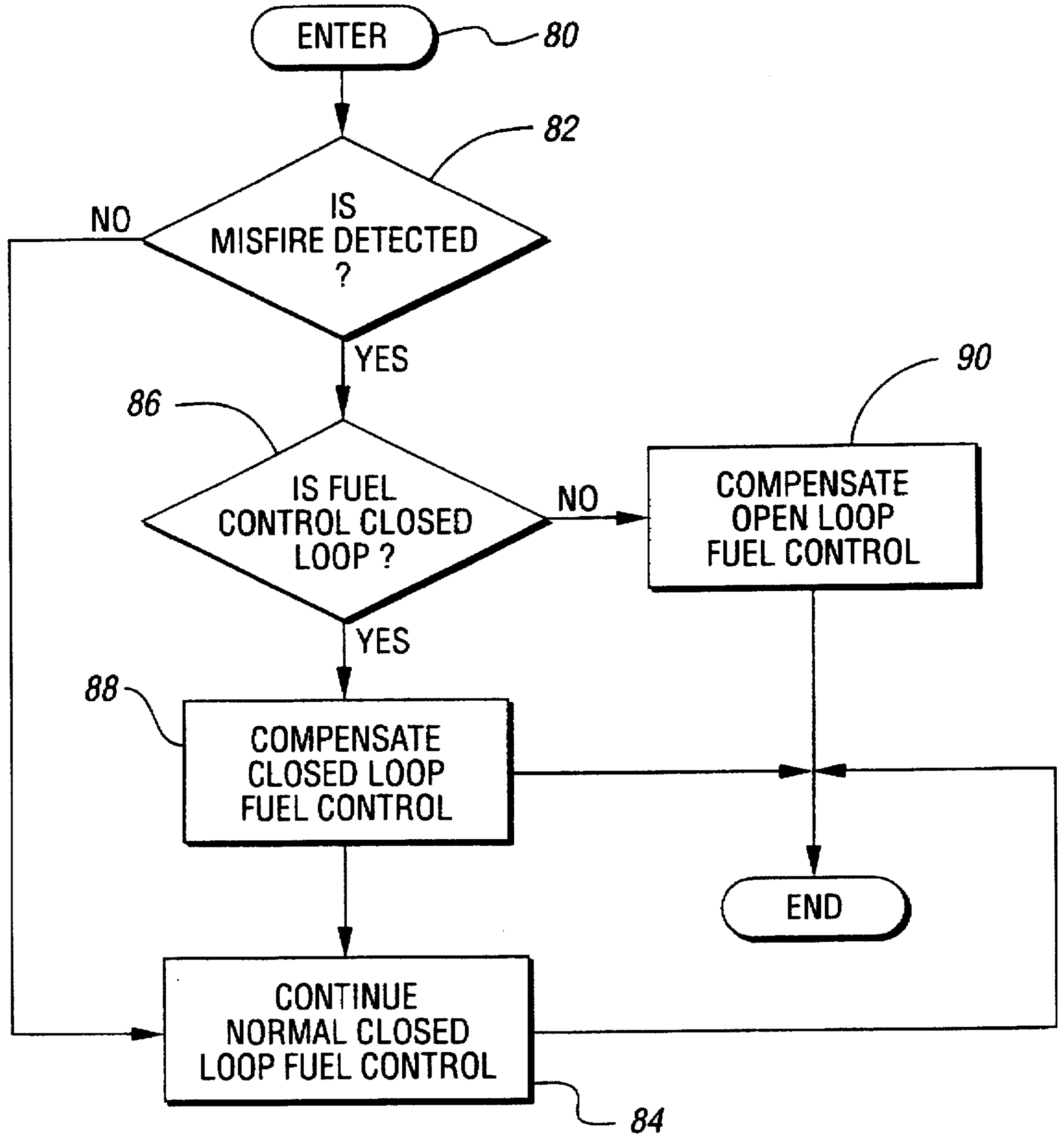
FIG. 5 is a flowchart of the fuel control system of the present invention.

Referring now to FIG. 5, a subroutine for compensating for the effect of engine misfire is entered at 80. As long as no engine misfire is detected as determined by the block 82, normal closed loop fuel control operations continue, as indicated at block 84. Any suitable misfire detector may be employed in the present invention. One such misfire detector is disclosed in U.S. Pat. No. 5,044,195, assigned to the assignee of the present invention. If a misfire is detected and the fuel control system is operating in closed loop as determined by the block 86, then a misfire correction value is added to the closed loop fuel control equation implemented by the engine controller as indicated at block 88. The compensation value may be obtained from a look-up table of experimentally determined values based on engine speed, load, misfire rates and/or types. If the fuel control system is operating in an open loop condition, such as under a lean cruise mode of operation, then the compensation is applied at block 90.

While the best mode for carrying out the present invention has been described in detail, those familiar with the art to which this invention relates will recognize various alternative designs and embodiments for practicing the invention as defined by the following claims.

What is claimed is:

1. A method of controlling fuel to an engine during engine misfire to reduce the risk of damage to the catalyst inside a catalytic converter installed in the exhaust passage of the engine, said engine having a fuel injector included in a fuel control system including a computer for controlling the amount of fuel injected into a cylinder of said engine, comprising a sequence of the following steps:

detecting an engine misfire;

detecting mass air flow to the engine;

detecting the engine exhaust oxygen level relative to a reference level;

calculating a nominal fuel pulse width for a fuel injector based on detected mass air flow to achieve a stoichiometric air/fuel ratio;

adjusting said nominal pulse width to reflect the oxygen level in the exhaust from said engine;

adding a misfire correction value to said calculation to offset the increase in pulse width that will occur as a result of the increase in the exhaust gas oxygen level due to the unburnt air/fuel mixture caused by the misfire;

whereby said catalyst is prevented from exceeding a predetermined catalyst temperature threshold.

2. A system of compensating an open loop fuel control system for an engine for the occurrence of engine misfire, comprising:

an engine misfire detector;

a controller for calculating a pulse width modulated fuel injector signal that mitigates any change in engine air/fuel ratio due to said misfire, said engine includes normal firing cylinders and misfiring cylinders and a catalyst is located in the exhaust passage of the engine, wherein said controller adds a misfire correction value to reduce the amount of fuel to the normally firing cylinders to reduce the excess fuel and air available from the normally firing cylinders from mixing in the exhaust with the excess unburned fuel and air from the misfiring cylinders.

3. A system of compensating a closed loop fuel control system for an engine for the occurrence of engine misfire, comprising:

an engine misfire detector;

a controller for calculating a pulse width modulated fuel injector signal that mitigates any change in engine air/fuel ratio due to said misfire, and adds a misfire correction value to offset the A/F enrichment that will occur from said misfire, said system further including a catalyst located inside a catalytic converter installed in the exhaust passage of the engine;

a mass air flow sensor;

an engine exhaust oxygen sensor;

said controller calculating a nominal fuel pulse width signal based on detected mass air flow to achieve a stoichiometric air/fuel ratio;

said controller adjusting said nominal pulse width to reflect the oxygen level in the exhaust from said engine;

said controller adding a misfire correction value to said calculation to offset the increase in pulse width that will occur as a result of the increase in the exhaust gas oxygen level due to the unburnt air/fuel mixture caused by the misfire;

whereby said catalyst is prevented from exceeding a predetermined catalyst damage temperature threshold.

* * * * *